(12) United States Patent
Wang et al.

(10) Patent No.: US 12,111,945 B2
(45) Date of Patent: Oct. 8, 2024

(54) SECURED MANAGEMENT OF DATA DISTRIBUTION RESTRICTIONS

(71) Applicant: Google LLC, Mountain View, CA (US)

(72) Inventors: Gang Wang, Jersey City, NJ (US); Kevin Wei Li Yeo, New York City, NY (US)

(73) Assignee: Google LLC, Mountain View, CA (US)

( * ) Notice: Subject to any disclaimer, the term of this patent is extended or adjusted under 35 U.S.C. 154(b) by 341 days.

(21) Appl. No.: 17/760,881

(22) PCT Filed: Dec. 4, 2020

(86) PCT No.: PCT/US2020/063409
§ 371 (c)(1),
(2) Date: Mar. 16, 2022

(87) PCT Pub. No.: WO2022/119578
PCT Pub. Date: Jun. 9, 2022

(65) Prior Publication Data
US 2022/0414247 A1    Dec. 29, 2022

(51) Int. Cl.
*G06F 21/62* (2013.01)
(52) U.S. Cl.
CPC ...... *G06F 21/6218* (2013.01); *G06F 21/6254* (2013.01); *G06F 21/6263* (2013.01)
(58) Field of Classification Search
CPC ............. G06F 21/6218; G06F 21/6254; G06F 21/6263
See application file for complete search history.

(56) References Cited

U.S. PATENT DOCUMENTS 8,548,981 B1 * 10/2013 Bhattacharjee ..... G06F 16/3326
                                                              707/706
9,679,314 B1 *  6/2017 Wang .................. G06F 16/9535
(Continued)

FOREIGN PATENT DOCUMENTS

KR    10-2019-0012928    2/2019
WO    WO 2020146066     7/2020

OTHER PUBLICATIONS

International Search Report and Written Opinion in International Appln. No. PCT/US2020/063409, dated Sep. 1, 2021, 16 pages.
Extended European Search Report in European Appln. No. 23176573.6, dated Jul. 5, 2023, 5 pages.
(Continued)

*Primary Examiner* — Linglan Edwards
(74) *Attorney, Agent, or Firm* — Fish & Richardson P.C.

(57) ABSTRACT

Methods, systems, and apparatus, including computer programs encoded on a computer storage medium, for allowing suitable digital components to be automatically selected and provided to a client device. Methods can include generating a universal identifier for a digital component that is presented in the application. The application updates a set of universal identifiers that has been created for digital components presented by the application over a specified time period. The application identifies digital components and the corresponding universal identifiers that are blocked and generates a probabilistic data structure representing the set of blocked universal identifiers. The application creates multiple shares of the probabilistic data structure and transmits different shares to different servers. The application receives a separate response generated by each of the different servers based on the multiple shares and identifies a digital component to present in the application based on a combination of the separate responses.

20 Claims, 4 Drawing Sheets

(56) References Cited

U.S. PATENT DOCUMENTS

| | | | |
|---|---|---|---|
| 10,395,260 B2* | 8/2019 | Hartman | G06F 16/9535 |
| 10,853,422 B2* | 12/2020 | Laine | G06F 16/2453 |
| 11,676,160 B2* | 6/2023 | Sullivan | G06N 7/01 |
| | | | 705/7.31 |
| 11,755,545 B2* | 9/2023 | Sheppard | G06N 7/01 |
| | | | 707/754 |
| 11,909,864 B2* | 2/2024 | Wright | H04L 9/0825 |
| 11,968,297 B2* | 4/2024 | Wang | H04L 9/3255 |
| 2013/0326007 A1 | 12/2013 | Turner et al. | |
| 2014/0324575 A1 | 10/2014 | Haies et al. | |
| 2015/0348102 A1 | 12/2015 | Alsina et al. | |
| 2017/0228547 A1 | 8/2017 | Smith et al. | |
| 2020/0336313 A1 | 10/2020 | Knox et al. | |

OTHER PUBLICATIONS

International Preliminary Report on Patentability in International Appln. No. PCT/US2020/063409, mailed on Jun. 15, 2023, 10 pages.

Many et al., "Fast private set operations with sepia." ETZ G93, Mar. 2012, 11 pages.

Notice of Allowance in European Appln. No. 20829257.3, dated Apr. 19, 2023, 11 pages.

Notice of Allowance in Japanese Appln. No. 2021-576384, dated Mar. 20, 2023, 5 pages (with English translation).

Notice of Allowance in Japanese Appln. No. 2023-067940, mailed on May 27, 2024, 5 pages (with English translation).

Notice of Allowance in Korean Appln. No. 10-2021-7041373, mailed on Jul. 16, 2024, 4 pages (with English translation).

* cited by examiner

SECURED MANAGEMENT OF DATA DISTRIBUTION RESTRICTIONS

CROSS-REFERENCE TO RELATED APPLICATIONS

This application is a National Stage Application under 35 U.S.C. § 371 and claims the benefit of International Application No. PCT/US2020/063409, filed Dec. 4, 2020. The disclosures of the foregoing applications are incorporated herein by reference in their entirety.

BACKGROUND

This specification relates to data processing and data security.

A client device can use an application (e.g., a web browser, a native application) to access a content platform (e.g., a search platform, a social media platform, or another platform that hosts content). The content platform can display, within an application launched on the client device, digital components (a discrete unit of digital content or digital information such as, e.g., a video clip, an audio clip, a multimedia clip, an image, text, or another unit of content) that may be provided by one or more content source/platform. Some systems restrict the distribution of data, such as digital components, for various reasons, such as saving processing resources. However, techniques for implementing those restrictions may lead to data security issues.

SUMMARY

In general, one innovative aspect of the subject matter described in this specification can be embodied in methods including the operations of generating, by an application and for a digital component presented in the application, a universal identifier that is an encrypted version of a combination of (i) a campaign identifier for a content source that provides the digital component and (ii) a domain of the content source; updating, by the application, a set of universal identifiers that have been created for digital components presented by the application over a specified time period based on the generated universal identifier; identifying, by the application, a set of blocked universal identifiers corresponding to universal identifiers that have been (i) generated by the application, and (ii) blocked from being used to present future digital components in the application; generating, by the application, a probabilistic data structure representing the set of blocked universal identifiers; creating, by the application, multiple shares of the probabilistic data structure; transmitting, by the application, different ones of the multiple shares to different servers; receiving, by the application, a separate response generated by each of the different servers based on the different ones of the multiple shares transmitted to the different servers; and identifying, by the application and based on a combination of the separate responses, a digital component to present in the application.

Other implementations of this aspect include corresponding apparatus, systems, and computer programs, configured to perform the aspects of the methods, encoded on computer storage devices. These and other implementations can each optionally include one or more of the following features.

In some aspects interaction with a mute element corresponding to a given digital component presented in the application is detected and the set of blocked universal identifiers is updated to include the universal identifier of the given digital component in response to detecting the interaction with the mute element in a most recent timeframe.

In some aspects updating the set of universal identifiers includes incrementing a presentation counter indicative of a frequency of presentation of digital components having a particular universal identifier in response to presentation of a digital component associated with the particular universal identifier by the application. In some aspects updating the set of universal identifiers includes adding the particular universal identifier to the set of blocked universal identifiers when the presentation counter exceeds a specified value.

In some aspects generating the probabilistic data structure includes generating the probabilistic data structure representing (i) the set of blocked universal identifiers and (ii) a set of user group identifiers corresponding to user groups assigned to a user of the application. In some aspects generating the probabilistic data structure further includes using a pseudo random function that is parameterized by two or more random variables and wherein the probabilistic data structure is a cuckoo filter.

In some aspects an entity providing the digital component can generate the universal identifier for the digital component.

Particular embodiments of the subject matter described in this specification can be implemented so as to realize one or more of the following advantages. Access to certain types of data may be restricted, prevented, or secured by using a secure multi-party computation ("MPC") process, which can be performed by two or more MPC servers operated by different parties, to determine when to distribute digital components to client devices and/or what digital components to distribute. The MPC servers can make determinations, for example, by separately processing different secret shares of data (e.g., disparate or disjoint subsets of a data set) that are provided to different ones of the MPC servers to ensure that full set of data cannot be accessed in cleartext by either MPC server or any other party that may gain access to data represented by one of the secret shares.

The amount of data and processing resources required to make determinations can be reduced, for example, by using a probabilistic data structure, e.g., a cuckoo filter that can simultaneously represent digital components that are blocked from presentation and groups (e.g., interest groups) to which a user of a client device requesting presentation of data, such as a digital component, belongs, without revealing sensitive data about the user. Using probabilistic data structures in this way protects user privacy and reduces the size of the information provided to the MPC cluster. This reduction in data size reduces the amount of bandwidth consumed to transmit the information, reduces the latency in transmitting the information, and reduces the amount of processing power and associated battery power for devices running on batteries (e.g., mobile devices) required to transmit the information.

The use of a probabilistic data structure, as mentioned above, can also reduce the amount of processing resources (e.g., memory, CPU cycles, or cloud computing resources) required to determine whether the user of a client device is eligible to receive certain types of data by performing the analysis with less than five lookup operations (e.g., in some instances no more than two lookup operations), where existing techniques may require hundreds of lookups to arrive at the same result. More specifically, using the probabilistic data structure ensures that the information required to be identified to provide a particular set of data (e.g., digital component) to a particular client device will only be found in a specified number (e.g., two or three) locations of the probabilistic data structure, such that only those two locations need to be examined by a computing device. This clearly improves the efficiency of the computing system itself, and can lead to preservation of resources, such as battery life, energy consumption, required equipment cooling. It can also result in the ability to obtain results faster than systems that are required to perform hundreds of lookup operations, as compared to performing less than five lookup operations.

The MPC cluster can transmit secret shares of a result that identifies a selected digital component that the MPC cluster selected using the secure MPC process. By sending secret shares of a result for only selected digital components rather than information for all or a large set of digital components similarly reduces consumed bandwidth, latency, processing power, and battery power in transmitting and receiving the result. This also reduces the potential leakage of confidential information of content platforms that submit selection values for digital components to the MPC cluster by limiting the number of digital components for which information is provided to the client device. The present disclosure thus allows suitable digital components to be automatically selected and provided to a client device whilst respecting blocked digital components associated with the client device. This is achieved in a way which increases the security of user data transmitted over the network and which makes efficient use of processor and bandwidth resources.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
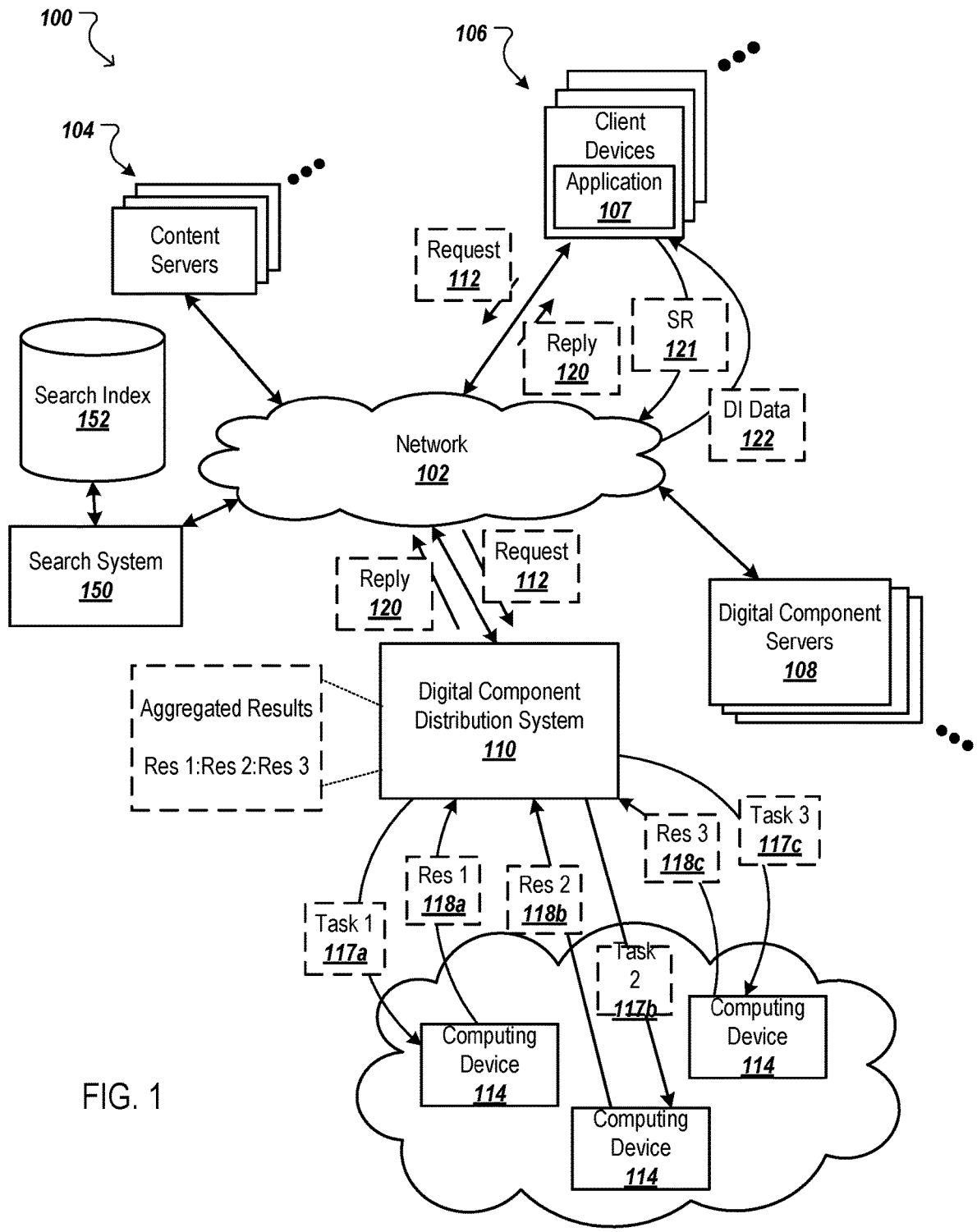
FIG. 1 is a block diagram of an example environment in which digital components are distributed.

This document discloses methods, systems, apparatus, and computer readable media that are used to implement techniques for limiting access to particular types of data. In some situations, the techniques discussed herein can be used to regulate, restrict, limit, or prevent distribution of data to a client device (or a user of a client device) that has been previously provided data a predetermined number of times. For example, the display of digital components on a client device that have been previously displayed at that client device, or to the user of that client device (e.g., at various different client devices) a predetermined number of times can be prevented or otherwise restricted. The techniques further enable users of the client devices to block certain types of data (e.g., certain types of digital components) from being delivered to or presented on the client device. This can prevent wasted resources that would otherwise be consumed by delivering data that is stale or unwanted to client devices. The techniques discussed herein are described with reference to distribution of digital components to client devices, but the techniques can also be applied to the regulation of any data, such that access to any data can be limited or secured using these techniques.

In general, users connected to the internet via client devices can be provided with digital components. In such scenarios, the digital component server may control access to the digital components based on third party cookies (e.g., cookies from a domain that differs from the domain of the web page currently being viewed by a user), and activity data such as the users' online activity, user browsing history. For example, the digital component server can use information contained in cookies (e.g., third party cookies that collect data across multiple domains/websites) to provide digital components based on prior websites visited by the user of the client device. However, in browsers that block the use of third party cookies, the browsing information typically collected across multiple websites is no longer available. As such, any functionality, such as regulating distribution of data to client devices, that relies on information collected by third party cookies (e.g., cookies from a domain, such as an effective top-level domain (eTLD+1), that differs from the domain of the web page currently being viewed by a user), is no longer available.

The techniques described in this document enable the regulation of data access independent of third party cookies or other device/browser identifiers, such that these techniques can be used to control access to (e.g., distribution of) data, such as digital components, to client devices even when the use of third party cookies has been blocked (e.g., by a browser installed on a client device). These techniques can also be implemented in a manner such that the complete data set used to control access to the data provided by a server, resides entirely (or in significant part) on the client device, while only portions of (e.g., disparate or disjoint subsets of the full dataset are provided to remote servers. This prevents the complete data set upon which access control decisions are made from being accessible by any of the remote servers that contribute to the techniques discussed herein.

As described further in this specification, the application executing on the client device generates a universal identifier identifying a source of data that has been previously provided to the client device. For example, in the context of digital components, the universal identifier can uniquely represent an entity that provided the digital component and/or a specific digital component group (e.g., campaign) that triggered transmission of the digital component to a client device. The universal identifier corresponding to each digital component can be delivered to the client device with each digital component, such that the digital component can keep track of the frequency with which digital components from a particular entity and/or digital component group are delivered to the client device. In a more general regulated data access implementation, a similar technique can be used to enable the client device to keep track of the frequency with which data provided by certain entities and/or contained in certain databases, indices, or folders were transmitted to (or downloaded by) the client device.

As discussed in more detail below, the universal identifiers can be used by a client-side application to keep track of which digital components (or other types of data) are allowed to be presented (or accessed) or should be blocked from being presented (or accessed) based on the frequency with which digital components corresponding to a particular universal identifier have been delivered to and/or presented by the client device. Additionally, the use of the universal identifiers enables the client device to regulate the blocking of delivery of certain types of digital components (or other data) from specified sources, as requested by a user of the client device. In some situations, the client device can maintain a set (e.g., list) of blocked universal identifiers, which specifies that digital components having a universal identifier matching one of the blocked universal identifiers is prevented from being delivered to or presented by the client device. Even though, in this document, the techniques and methods use universal identifiers as a method of identifying digital components and campaigns, it should be noted that the methods and techniques can be extended to other forms of identification. For example, digital components or the campaigns can be identified using a tag or a label associated to them. For example, if the user of the client device wants to block all digital components related to soda drinks, all digital components related to soda drink can be identified using the term "soda drink". In such a scenario, the term "soda drink" can either be a taxonomy term used in association with digital components related to soda drinks or it be a term used across the internet to identify such digital components.

The techniques further enable the client-side application to keep track of the number of times different digital components are presented on the client device, and restrict the presentation of certain digital components having universal identifiers that have been identified by the application at least a predetermined number of times over a specified period of time. In other words, once a certain universal identifier has been encountered a predetermined number of times in some timeframe, the client side application can prevent further data (e.g., digital components) having that certain universal identifier from being transmitted to or presented on the client device, at least temporarily, by adding the universal identifier to the set of blocked universal identifiers. To enforce restrictions on the subsequent delivery of data, such as digital components to the client device, the client device generates a probabilistic data structure using the set of blocked universal identifiers and shares the probabilistic data structure with one or more remote servers (e.g., two or more MPC servers) that can use the probabilistic data structure during the process of selecting data (e.g., digital components) to deliver to the client device.

In some aspects, the digital component server can deploy a secure multi-party computation (MPC) system that includes two or more computation servers to perform secure MPC process to select digital components based on probabilistic data structure without either MPC server being able to access information in cleartext. The techniques enable the client device to generate and transmit the probabilistic data structure in secret shares to each of the servers in the MPC system thereby maintaining user privacy and anonymity. The techniques and methods are further explained with reference to FIG. 1-4.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects content servers 104, client devices 106, digital component servers 108, and a digital component distribution system 110 (also referred to as a component distribution system (CDS)).

A client device 106 is an electronic device that is capable of requesting and receiving resources over the network 102. Example client devices 106 include personal computers, mobile communication devices, wearable devices, personal digital assistants, gaming systems, virtual reality systems, streaming media devices, and other devices that can send and receive data over the network 102. A client device 106 typically includes a user application 112, such as a web browser, to facilitate the sending and receiving of data over the network 102, but native applications executed by the client device 106 can also facilitate the sending and receiving of data over the network 102. Client devices 106, and in particular personal digital assistants, can include hardware and/or software that enable voice interaction with the client devices 106. For example, the client devices 106 can include a microphone through which users can submit audio (e.g., voice) input, such as commands, search queries, browsing instructions, smart home instructions, and/or other information. Additionally, the client devices 106 can include speakers through which users can be provided audio (e.g., voice) output. A personal digital assistant can be implemented in any client device 106, with examples including wearables, a smart speaker, home appliances, cars, tablet devices, or other client devices 106.

An electronic document is data that presents a set of content at a client device 106. Examples of electronic documents include webpages, word processing documents, portable document format (PDF) documents, images, videos, search results pages, video games, virtual (or augmented) reality environments, and feed sources. Native applications (e.g., "apps"), such as applications installed on mobile, tablet, or desktop computing devices are also examples of electronic documents. Electronic documents can be provided to client devices 106 by content servers 104. For example, the content servers 104 can include servers that host publisher websites. In this example, the client device 106 can initiate a request for a given publisher webpage, and the content server 104 that hosts the given publisher web page can respond to the request by sending machine executable instructions that initiate presentation of the given webpage at the client device 106.

In another example, the content servers 104 can include app-servers from which client devices 106 can download apps. In this example, the client device 106 can download files required to install an app at the client device 106, and then execute the downloaded app locally. The downloaded app can be configured to present a combination of native content that is part of the application itself, as well as one or more digital components (e.g., content created/distributed by a third party) that are obtained from a digital component server 108, and inserted into the app while the app is being executed at the client device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or the digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The digital component request 112 can include event data specifying features such as a name (or network location) of a server from which media is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The digital component request 112 can include event data specifying other event features, such as the electronic document being requested and characteristics of locations of the electronic document at which digital component can be presented. For example, event data specifying a reference (e.g., Uniform Resource Locator (URL)) to an electronic document (e.g., webpage or application) in which the digital component will be presented, available locations of the electronic documents that are available to present digital component, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital component that are eligible for presentation with the electronic document. The event data can also include a search query that was submitted from the client device 106 to obtain a search results page and/or data specifying search results and/or textual, audible, or other visual content that is included in the search results.

Component requests 112 can also include event data related to other information, such as information that a user of the client device 106 has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The digital component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document as well as wasting system bandwidth and other resources. Further, delays in providing the digital component can result in a failed delivery of the digital component, for example, if the electronic document is no longer presented at the client device 106 when the digital component is provided.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that is associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented.

In some implementations, the digital component distribution system 110 is implemented in a distributed computing system that includes, for example, a server and a set of multiple computing devices 114 that are interconnected and identify and distribute digital components in response to component requests 112. The set of multiple computing devices 114 operate together to identify a set of digital components that are eligible to be presented in the electronic document from among a corpus of millions of available digital components.

In some implementations, the digital component distribution system 110 implements different techniques for selecting and distributing digital components. For example, digital components can include corresponding distribution parameters that contribute to (e.g., condition or limit) the selection/distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In another example, the distribution parameters for a particular digital component can include distribution keywords that must be matched (e.g., by electronic documents, document keywords, or terms specified in the component request 112) in order for the digital components to be eligible for presentation. The distribution parameters can also require that the component request 112 include information specifying a particular geographic region (e.g., country or state) and/or information specifying that the component request 112 originated at a particular type of client device 106 (e.g., mobile device or tablet device) in order for the component item to be eligible for presentation. The distribution parameters can also specify an eligibility value (e.g., rank, score or some other specified value) that is used for evaluating the eligibility of the component item for selection/distribution/transmission (e.g., among other available digital components), as discussed in more detail below. In some situations, the eligibility value can be based on an amount that will be submitted when a specific event is attributed to the digital component item (e.g., presentation of the digital component).

The identification of the eligible digital components can be segmented into multiple tasks 117a-117c that are then assigned among computing devices within the set of multiple computing devices 114. For example, different computing devices in the set 114 can each analyze a different digital component to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital component items that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the component request 112. For example, the digital component distribution system 110 can select a set of winning digital components (one or more digital components) based on the outcome of one or more digital component evaluation processes. In turn, the digital component distribution system 110 can generate and transmit, over the network 102, reply data 120 (e.g., digital data representing a reply) that enable the client device 106 to integrate the set of winning digital component into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a URL) and a script that causes the client device 106 to transmit a server request (SR) 121 to the digital component server 108 to obtain a given winning digital component from the digital component server 108. In response to the server request 121, the digital component server 108 will identify the given winning digital component specified in the server request 121 and transmit, to the client device 106, digital component data 122 (DI Data) that presents the given winning digital component in the electronic document at the client device 106.

In some cases, it is beneficial to a user to receive digital components (or other data) related to web pages, application pages, or other electronic resources previously visited and/or interacted with by the user. In order to distribute such digital components to users, the users can be assigned to user groups, e.g., user interest groups, cohorts of similar users, or other group types involving similar user data based on the digital content accessed by the user. For example, when a user visits a particular website and interacts with a particular item presented on the website or adds an item to a virtual cart, the user can be assigned to a group of users who have visited the same website or other websites that are contextually similar or are interested in the same item. To illustrate, if the user of the client device 106 searches for shoes and visits multiple webpages of different shoe manufacturers, the user can be assigned to the user group "shoe," which can include identifiers for all users who have visited websites related to shoes.

In some implementations, a user's group membership can be maintained at the user's client device 106, e.g., by a browser based application, rather than by a digital component server 108 or by a content platform 104, or by another party. The user groups can be specified by a respective label of the user group. The label for a user group can be descriptive of the group (e.g., gardening group) or a code that represents the group (e.g., an alphanumeric sequence that is not descriptive). The label for a user group can be stored in secure storage at the client device 106 and/or can be encrypted when stored to prevent others from accessing the list.

In some implementations, an identifier for a user group can be generated using hash-based message authentication code (HMAC) parameterized by the label of the user group and the domain of the content platform 104 represented as HMAC (user_group_label, eTLD+1). In some implementations, the HMAC can be implemented using secure hash algorithm (SHA-256) which is a cryptographic hash function with a digest length of 256 bits to generate a hashed 256 bit (32 byte) output. In such an example, HMAC (user_group_label, eTLD+1) generates, as the user group identifier, a 256 bit unique identifier for the user group.

Content platforms 104 can use the user group membership of a user to select digital components or other content that may be of interest to the user or may be beneficial to the user/user device in another way (e.g., assisting the user in completing a task). For example, such digital components or other content may include data that improves a user experience, improves the running of a user device or benefits the user or user device in some other way.

When the application 107 such as a browser loads a website 142 of the publisher 140 that includes one or more digital component slots, the application 107 can request a digital component for each slot. In some implementations, the digital component slot can include codes (e.g., scripts) that cause the application 107 to request a digital component for presentation to a user of the client device 106. After receiving the digital components as a response from the digital component server, the digital components are presented in the respective digital component slots of the website 142. However, in such a situation, to avoid repetitive presentation of the same digital components, the application 107 can maintain a set of universal identifiers such that each identifier in the set can uniquely identify a digital component that was previously presented on the client device 106. For example, a trusted program (e.g., a web browser or the operating system can maintain a set of identifiers, or the client device 106).

In some implementations, each digital component can include an identifier that uniquely identifies each digital component within the domain of the content source (for e.g. the digital component server 108). In other implementations, a digital component can be a part of a campaign for a digital component server 108. For example, a digital component server 108 can start a campaign for promoting a particular brand of shoes. To promote the campaign, the digital component server 108 can provide multiple digital components that are contextually related to the particular brand of shoes. In such a scenario, each of the multiple digital components that are contextually related to the brand of shoes is a part of the campaign. In such scenarios, each of the multiple digital components in a campaign can be identified with a unique identifier (referred to as a campaign identifier) that distinguishes the campaign from other campaigns of the digital component server 108.

When a digital component is presented on the client device 106 via the application 107, the application 107 retrieves the campaign identifier that was assigned to the digital component by the digital component server 108. In some implementations, the application 107 can also retrieve the eTLD+1 of the domain of the digital content provider. The eTLD+1 is the effective top-level domain (eTLD) plus one level more than the public suffix. An example eTLD+1 is "example.com" where ".com" is the top-level domain.

After retrieving the campaign identifier and the eTLD+1 of the domain of the digital content provider, also referred to as a content source, for a particular digital component, the application 107 can generate a universal identifier for the particular digital component. In some implementations, the digital component servers 108 can generate and assign universal identifiers to the digital components. In such implementations, the application 107 can retrieve the universal identifiers of the digital components that are presented on the client device 106. A universal identifier is data that uniquely represents digital components that are (i) provided by a particular content source (e.g., digital content provider), and (ii) triggered for delivery to client devices by a same campaign, or set of distribution rules. In other words, two different digital components (or other data files) that have a same universal identifier are deemed to have originated from a same content source, and to have been triggered for delivery by a same campaign. For brevity, and readability, the description that follows will also refer to the universal identifier as uniquely identifying a particular digital component. In some implementations, the universal identifier for a digital component can be calculated using hash-based message authentication code (HMAC) parameterized by the campaign identifier and domain of the digital component server 108 represented as HMAC (campaign_identifier, eTLD+1). In some implementations, the HMAC can be implemented using secure hash algorithm (SHA-256) which is a cryptographic hash function with a digest length of 256 bits to generate a hashed 256 bit (32 byte) output. In such an example, HMAC (campaign_identifier, eTLD+1) generates, as the universal identifier, a 256 bit unique identifier for the digital component.

By using hash functions to generate universal identifiers, without additional information, it is computationally impractical for any entity other than the application 107 executing on the client device 106 and the respective digital component server 108 of the digital components to find out the identity of the content source that provided the digital component or the campaign identifiers used by the content source. Thus, the hash function approach protects the content source's confidential information if another entity receives a set of universal identifiers or somehow obtains unauthorized access to universal identifiers.

The application 107 maintains a set of universal identifiers that uniquely identifies digital components across the entire space of campaigns across all digital component servers 108. In some implementations, the set of universal identifiers includes, is indexed to, or otherwise associated with a presentation counter for each of the universal identifiers in the set. The presentation counter for each particular universal identifier is indicative of a frequency of delivery and/or presentation of digital components having that particular universal identifier. For example, the presentation counter for a particular universal identifier can signify the number of times digital components having that particular universal identifier were previously delivered to and/or presented on the client device 106 in a given timeframe.

After computing/generating a universal identifier for a particular digital component that was delivered to and presented on the client device 106, the application 107 updates the set of universal identifiers with the universal identifier of the particular digital component. In a situation where the universal identifier for the particular digital component does not already exist in the set, the application 107 adds the universal identifier of the particular digital component to the set and increments the corresponding presentation counter by one. In a situation where the universal identifier for the particular digital component already exists in the set, the application 107 updates the corresponding presentation counter of the universal identifier, for example, by incrementing the counter by one.

In some implementations, the application 107 executing at the client device 106 can maintain a set of blocked universal identifiers that includes universal identifiers of digital components have either been explicitly blocked by the user. For example, assume that a user interacts with a mute element corresponding to a given digital component (or a portion of data that was delivered to the client device 106). In this example, the user's interaction with the mute element is an indication that the user does not want to see that digital component, or potentially similar digital components (e.g., from a same content source or campaign), in the future (e.g., for at least a certain amount of time). In response to the interaction the application 107 can add the universal identifier for the given digital component to the set of blocked universal identifiers, which can then be used to prevent delivery (or presentation) of other digital components having the same universal identifier as the given digital component.

The application 107 can add to the set of blocked universal identifiers, those universal identifiers of digital components that have been delivered/presented at least a predetermined number of times (e.g., presented more than X times over a specified time period, such as a day, a week, a month, etc.). For example, when digital components having the universal identifier 1A2B3C have been delivered to and presented to a particular user more than X times over the last Y days, the application 107 can add the universal identifier 1A2B3C to the set of blocked universal identifiers, which is stored at the client device 106.

The threshold number of presentations and/or specified time period for adding a universal identifier to the set of blocked universal identifiers can be specified on a per-content-source and/or per-campaign basis. For example, a digital component server can store a set of rules of a campaign that do not allow presentation of digital components of a campaign to exceed more than a set number (referred to as max_ppt) of times within a set duration of time (referred to as max_time) on the client device 106. In such a scenario, the application 107 while retrieving the digital component identifier and the eTLD+1 domain from the response that includes the digital components, can also retrieve information that defines the rules of the campaign. While presenting digital components of a particular campaign over a period of time and updating the set of universal identifier associated with the digital components, if the presentation counter exceeds max_ppt, the application 107 updates the set of blocked universal identifiers by adding the universal identifier to the set of blocked universal identifiers. For example, assume that the application 107 retrieves the rules of a particular campaign set by the digital component server 108 that sets the max_ppt as 2 and max_time as 60 seconds. Further assume that the application 107 has presented a first digital component that was provided by the digital component server 108 for the particular campaign. At this point, the application 107 generates a universal identifier for the first digital component and updates the set of universal identifiers by including the universal identifier for the first digital component and increments the corresponding presentation counter from 0 to 1. Note that the max_ppt=2 and max_time=60 seconds means that only one more digital component can be presented on the client device 106 that belongs to the particular campaign of the digital component server 108 within 60 seconds after the presentation of the first digital component.

Continuing with the above example, assume that 20 seconds after the presentation of the first digital component, the application 107 receives a second digital component from the same digital component server 108 for the particular campaign. The application 107 generates a universal identifier for the second digital component and updates the set of universal identifiers by incrementing the corresponding presentation counter from 1 to 2. Note that at this point, the number of times digital components provided by the digital component server 108 and related to the particular campaign that has been presented on the client device 106 is 2 (i.e., equal to max_ppt). In such a situation, the application 107 adds the universal identifier to the set of blocked universal identifiers, thereby indicating that digital components (or other data) having that same universal identifier (or an otherwise matching universal identifier that may not be exactly the same, such as within a range of values) is prevented from being presented at the client device 106.

In some implementations, the set of universal identifiers with the same max_time can be implemented using a first-in, first-out (FIFO) method. Each entry in the FIFO is a pair {time_stamp, universal_identifier}. Also assume that the digital component server 108 sets the max_ppt as 2 and max_time as 60 seconds for digital component belonging to a particular campaign of the digital component server i.e. for the particular campaign of the digital component server, a maximum of 2 digital components will be presented on the application 107 in a time duration of 60 seconds. In such a scenario, the FIFO implemented by the application 107 will hold two entries and every time a digital component from the particular campaign is presented on the application 107, an entry with a universal identifier of the campaign of the digital component and the timestamp of when the digital component was presented on the application 107 is pushed into the FIFO. Such an implementation can also include entry deletion methods that can automatically delete the first entry of the FIFO when the timestamp of the first entry is older than max_time. If at any point of time, if the FIFO contains more than max_ppt occurrences of universal_identifier, the corresponding entry is included in the set of blocked universal identifiers.

In some implementations, the application 107 can remove universal identifiers from the set of blocked universal identifiers thereby letting digital components associated with the deleted universal identifiers to be presented on the application 107 on the client device 106, if the user didn't block the campaign and/or digital component associated with the universal identifiers in the most recent period of time indicated by max_time. Continuing with the above example, an application can maintain a FIFO with pairs of blocked universal identifiers and the timestamp when the user blocked the corresponding campaign and/or digital component. The application automatically deletes the first entry of the FIFO, if the timestamp of the first entry is older than max_time. At any time, the application 107 may collect the set of blocked universal identifiers in the FIFO and the result is the set of blocked universal identifiers.

In some implementations, the application 107 can provide a user interface that enables a user to block and/or allow presentation of digital components at the client device. For example, the user interface can enable the user to select digital components that the user wishes to not see in future. In such a scenario, the application 107 can generate the universal identifier and add it to the set of blocked universal identifiers. This provides better transparency and control for the user. In another scenario, the user interface can enable the user to reset the set of blocked universal identifiers that will remove all entries from the set of blocked universal identifiers allowing presentation of all digital components on the client device 106.

In some implementations, the digital components provided by a digital component server 108 can include a mute element. The mute element is a user interface control that is included in the digital component, and in response to user interaction with the mute element triggers a script that generates an indication that the user does not want to see that digital component (or potentially similar digital components) in the future (e.g., for at least a certain period of time). In use, the user can interact with the mute element if the user wishes to not see similar digital components in future.

In such an implementation, the application 107 can include techniques and methods to determine user interaction with the mute element of the digital components that are presented on the client device 106 by analyzing a set of signals. For example, the application 107 can implement a heuristic based approach for determining a user interaction with the mute element of the digital component. In such implementations, the application 107 analyses signals generated by the user interaction with digital components provided by the digital component server 108.

In another example, the application 107 can implement machine learning models that includes multiple trainable parameters and is trained to determine user interaction of the user with the mute element of the digital components that are presented on the client device 106 by analyzing signals. The machine learning model can be any model deemed suitable for the specific implementation, such as decision trees, artificial neural network, genetic programming, logic programming, support vector machines, clustering, reinforcement learning, Bayesian inferencing, etc.

In another example, the website 142 that includes digital components slots where digital components are presented, can include machine executable instructions (for e.g., a script embedded in the website 142) to determine user interaction with the mute element of the digital component. After detecting a user interaction with the mute element, the machine executable instruction can inform the application 107 using one or more application user interfaces (API).

When the application 107, such as a browser, loads a website 142 that includes one or more digital component slots, the application 107 can request a digital component for each slot. In some implementations, the application 107 can generate a probabilistic data structure representing the set of blocked universal identifiers and the user groups to which the client device 106 (or user) belongs. In some situations, the application 107 can generate two cuckoo filters for the set of blocked universal identifiers and the user groups at the cost of more bandwidth consumption and more computation cost. The application 107 can transmit the probabilistic data structure along with the request for digital components to facilitate the regulation of delivery of data, such as digital components, to the client device 106.

In some implementations, the probabilistic data structure is a cuckoo filter. In general, a cuckoo filter includes an array of buckets where each bucket can hold b fingerprints. The fingerprint of an item is a bit string derived from the hash of that item. A cuckoo filter uses n hash functions that allows an item to be placed in n different buckets in any of the b positions. Typically, a cuckoo filter is identified by its fingerprint and bucket size. For example, a (2,4) cuckoo filter stores 2 bit length fingerprints and each bucket in the cuckoo array can store up to 4 fingerprints.

In some implementations, the application 107 uses a pseudo random function (PRF) parameterized by either the user group identifier or the universal identifier from the set of blocked universal identifiers and random variables generated by the application 107. For example, assume that the random variables generated by the application 107 are rand_var1a, rand_var1b and rand_var2. Also assume that each item in a bucket is a k-bit integer. The application can generate a cuckoo filter table using PRF(ug_id, rand_var1a) and PRF(blocked_uid, rand_var1b) where ug_id is the identifier of the user group generated by applying HMAC on the label of the user group based on the domain of the content provider and blocked_uid is an identifier from the set of blocked universal_identifier. Note that the process is repeated on all the user group identifiers and all the universal identifiers in the set of blocked universal identifiers.

As mentioned before, the digital component server 108 can deploy a secure multi-party computation (MPC) system that includes two or more computation servers to perform secure MPC process to select digital components based on probabilistic data structure without either MPC server being able to access information in cleartext. For example, assume that the MPC system includes two computation servers MPC1 and MPC2. To protect user privacy, the application 107 generates secret shares of the probabilistic data structure and transmits each of the secret shares to a respective computation server of the MPC system.

The application 107 can generate a vector B based on the cuckoo filter table generated for the user group identifiers and the universal identifiers in the set of blocked universal identifiers. The vector B can be represented as $B_i$=PRF(rand_var2, i)-$A_i$ where $A_i$ is the cuckoo filter table and i is the index of the vector $B_i$ and cuckoo filter table Ai. When the application 107 initiates a request for digital component for a slot, the application transmits rand_var1a, rand_var1b and rand_var2 to MPC1. The application 107 also transmits the vector B and rand_var1a and rand_var1b to MPC2. Note that since none of the computation servers MPC1 and MPC2 have access to all the three secret shares and the vector B, none of the computation servers can recreate the cuckoo filter table thereby maintaining user privacy.

In some implementations, the application 107 can use distributed point functions to generate shares of the set of blocked universal identifiers. The distributed point functions represent secret shares of the point function. In general, point functions are functions $f_i$: [N]→[N] where $f(x)=0$ when x!=i and $f(i)=1$. A secret sharing of a point function $f_i$ is two functions $g_i$: [N]→[N] and $h_i$: [N]→[N] such that $f_i(x)=g_i(x)+h_i(x)$ for all x in the set [N]. Furthermore, given specifications of the function hi or gi (but not both), it is impossible to recover the original function $f_i$.

Such implementations can use a cuckoo filter with tables using two hash functions F1 and F2. The client device can generate the cuckoo filter by calculating, for each user group identifier in the set of user group identifiers, both possible locations for the user group identifier using both hash functions F1 and F2. If at least one of the two possible locations is empty, the client device 110 can insert the element into the empty location, which could be in either table, to complete the insertion process for that user group identifier. If both locations are occupied, the client device 110 randomly picks one location and swaps the item currently in the location with the item to be inserted. The client device 110 can then recalculate the two hash functions F1 and F2 and try the insertion again. This process repeats until the insertion is successful or too many attempts have failed for each user group identifier in the set of user group identifiers. After the cuckoo filter is constructed, each user group identifier ug_id is stored in a specific index of the table.

For each universal identifier (blocked_uid) in the set of blocked universal identifier, a point function $G_{blocked\_uid}$ is needed that can be split into distributed point functions $g_{blocked\_uid, 1}$ and $g_{blocked\_uid, 2}$ such that, for $\forall j \in [1, C]$ the following relationships are satisfied.

$$G_{blocked\_uid}(i)=g_{blocked\_uid,1}(i)+g_{blocked\_uid,2}(i)=\text{blocked\_uid}$$

If $i=F_1(\text{blocked\_uid})$ $$G_{blocked\_uid}(i)=g_{blocked\_uid,1}(i)+g_{blocked\_uid,2}(i)=0 \text{ otherwise.}$$

Similarly, a point function $H_{block\_uid}$ is needed that can be split into distributed point functions $h_{block\_uid, 1}$ and $h_{block\_uid, 2}$ such that, for $\forall j \in [1, C]$ the following relationships are satisfied.

$$H_{blocked\_uid}(i) = h_{blocked\_uid,1}(i) + h_{blocked\_uid,2}(i) = \text{blocked\_uid}$$

if $i = F_2(\text{blocked\_uid})$ $H_{blocked\_uid}(i) = h_{blocked\_uid,1}(i) + h_{blocked\_uid,2}(i) = 0$ otherwise.

The distributed point functions of a particular point function can be evaluated on multiple possible points, e.g., multiple possible blocked identifiers, but the result is always zero except for the blocked_uid. The distributed point functions have a very small data size that can be transmitted over a network without using much bandwidth and with low latency compared with sending other encrypted forms of user group identifiers.

For a given blocked_uid, point function F1 and the corresponding first table (if blocked_uid was inserted into the first table) of the cuckoo filter, the application 107 generates a distributed point function $g_{blocked\_uid, 1}$ for computing system MPC1 and a distributed function $g_{blocked\_uid, 2}$ for computing system MPC2. Similarly, for a given blocked_uid, point function F2 and the corresponding second table (if blocked_uid was inserted into the second table) of the cuckoo filter, the application 107 generates a distributed point function $h_{blocked\_uid, 1}$ for computing system MPC1 and a distributed point function $h_{blocked\_uid, 2}$ for computing system MPC2.

Similarly the application 107 can use distributed point functions to generate secret shares of the all user group identifiers of user groups to which the application 107 is associated. For a given ug_id, point function F1 and the corresponding first table (if blocked_uid was inserted into the first table) of the cuckoo filter, the application 107 generates a distributed point function $g_{ug\_id, 1}$ for computing system MPC1 and a distributed function $gu_{g\_id, 2}$ for computing system MPC2. Similarly, for a given ug_id, point function F2 and the corresponding second table (if blocked_uid was inserted into the second table) of the cuckoo filter, the application 107 generates a distributed point function $h_{ug\_id, 1}$ for computing system MPC1 and a distributed point function $h_{ug\_id, 2}$ for computing system MPC2.

The application 107 executing on client device 106 can transmit a digital component request that includes corresponding secret shares to the corresponding computation server of the MPC system. For example, the application 107 generates and transmits a request for digital component to MPC1 that includes the first secret share of the probabilistic data structure (i.e., cuckoo filter). The request parameters include rand_var1a, rand_var1b and rand_var2. Similarly, the application 107 also transmits a request for digital component to MPC2 that includes the second secret share of the probabilistic data structure. The request parameters include the vector B, rand_var1a and rand_var1b.

In some implementations, after receiving the secret shares, each of the respective computation servers within the MPC system performs a secure MPC process using the secret shares of the probabilistic data structure to select a digital component. For example, MPC1 can calculate an array T where the $i_{th}$ element of the array $T_i = \text{PRF}(\text{rand\_var2}, i)$. Note that T and B are two additive secret shares of the cuckoo vector table A. For the purpose of explanation in the document the two additive secret shares are represented as $[A_{i, 1}]$ and $[A_{i, 2}]$. Also note that MPC1 can calculate $[A_{i, 1}]$ and MPC2 receives $[A_{i, 2}]$ from the application 107.

Continuing with the above example, when determining the eligibility of each digital component, a determination can be made whether each of the digital components is blocked by the set of blocked universal identifiers, and whether the user group identifier (e.g., interest group identifier) for the user matches the user group identifier corresponding to a selection value for each digital component). As part of this evaluation, MPC1 can calculate the following:

$[loc_{1, 1}] = [A_{H1}(ug\_id(sv)), 1] = \text{PRF}(ug\_id(sv), \text{rand\_var2})$ $[loc_{2, 1}] = [A_{H2}(ug\_id(sv)), 1] = \text{PRF}(ug\_id(sv), \text{rand\_var2})$ $[block_{1, 1}] = [A_{H1}(blocked\_uid(sv)), 1] = \text{PRF}(blocked\_uid(sv), \text{rand\_var2})$ $[block_{2, 1}] = [A_{H2}(blocked\_uid(sv)), 1]\text{PRF}(blocked\_uid(sv), \text{rand\_var2})$ Similarly MPC2 can calculate the following $[loc_{1, 2}] = [A_{H1}(ug\_id(sv)), 2] = \text{PRF}(ug\_id(sv), \text{rand\_var2})$ $[loc_{2, 2}] = [A_{H2}(ug\_id(sv)), 2] = \text{PRF}(ug\_id(sv), \text{rand\_var2})$ $[block_{1, 2}] = [A_{H1}(blocked\_uid(sv)), 2] = \text{PRF}(blocked\_uid(sv), \text{rand\_var2})$ $[block_{2, 2}] = [A_{H2}(blocked\_uid(sv)), 2] = \text{PRF}(blocked\_uid(sv), \text{rand\_var2}$ where sv is the selection value explained with reference to Table 2.

Each computation server of the MPC system can use the values determined above to determine the eligibility of different digital components based on the secret share information, even though the computation servers do not have access to the secret share of other computation servers of the MPC system. Generally speaking, each computation server of the MPC determines whether a specific user group identifier (e.g., interest group identifier) corresponding to each selection value (e.g., a score, ranking, bid or other selection value for each digital component) is included in the probabilistic data structure provided by the client device 106 by inspecting two locations within the secret share of the probabilistic data structure received by that computation server of the MPC system. Each computation server of the MPC system is also determining whether the universal identifier corresponding to each selection value is contained in the set of blocked universal identifiers that were included in the probabilistic data structure provided by the client device in the secret share of the probabilistic data structure received by that MPC. In order for a digital component to be eligible for distribution, the user group identifier associated with the selection value for that digital component must be found in the probabilistic data structure, and the universal identifier for the digital component cannot be found in the probabilistic data structure.

The calculations listed above result in an indication of whether either of the MPCs computation servers located the user group identifier (e.g., interest group identifier) associated with the selection value for the digital component in either of two specified locations in their respective secret shares of the probabilistic data structure. For example, MPC computation servers will execute a secure MPC process to calculate a value of 1 in secret shares for loc1 or loc2 i.e. the value for loc1 could be reconstructed from $[loc_{1,1}]$ and $[loc_{1,2}]$. Similarly the value for loc2 could be reconstructed from $[loc_{2,1}]$ and $[loc_{2,2}]$ if either of the two locations of the probabilistic data structure available to MPCs computation servers indicates a match to the user group identifier associated with the selection value. Otherwise, MPC servers will calculate a value of 0 in secret shares for both of loc1 and loc2, indicating that no match was identified between the user group identifier associated with the selection value and the user group identifiers for the user. The user group identifier associated with the selection value must be identified at one of the locations by the MPC system in order for the selection value to be eligible, and for the corresponding digital component to be eligible for delivery to the client device 106. However, if the digital component is blocked (e.g., by inclusion of its universal identifier in the set of blocked universal identifiers), then the digital component still won't be eligible for delivery, even if one of the MPCs identifies a match between the user group identifier of the selection value for the digital component and the user group identifiers of the user.

With respect to whether the digital component corresponding to a selection value is blocked, according to the relationships shown above, MPC1 will calculate a 1 for either of $block_1$ or $block_2$ if either of the two locations of the probabilistic data structure indicates that the universal identifier of the digital component is included in the set of blocked universal identifiers. Otherwise, MPC servers will calculate a 0 for both $block_1$ and $block_2$. If the universal identifier is determined to be included in the probabilistic data structure by the MPC servers, the digital component will be ineligible for delivery to the client device.

In order to determine the eligibility of each selection value, and corresponding digital component, the results of MPC1 and MPC2 must be evaluated to determine whether the digital component is blocked, and whether the user group identifier associated with the selection value was found in the probabilistic data structure. Continuing with the above example, as part of the eligibility determination, MPC1 can determine the eligibility of each candidate selection value (and candidate digital component), for example, by calculating a secret Boolean parameter $[is\_candidate_{sv,1}]$ as follows $$[is\_candidate_{sv,1}] = (1 - [loc_{1,1} == 0] \times [loc_{2,1} == 0]) \times [block_{1,1} == 0] \times [block_{2,1} == 0].$$

Similarly, MPC2 can calculate a secret Boolean parameter $[is\_candidate_{sv,2}]$ as follows $$[is\_candidate_{sv,2}] = (1 - [loc_{1,2} == 0] \times [loc_{2,2} == 0]) \times [block_{1,2} == 0] \times [block_{2,2} == 0].$$

These operations lead to a value of 1, which is an indication of eligibility for selection of a digital component to deliver to the client device 106, when the user group identifier (e.g., interest group identifier) of the user is found in either of the two specified locations of the secret share of the probabilistic data structure available to the MPC, and the universal identifier of the digital component is not found in either of the two specified locations of the secret share of the probabilistic data structure available to the MPC. If the universal identifier is found in either of the two specified locations inspected by the MPC, the value will be 0, making the digital component ineligible for delivery. These results can be used as part of a digital component selection process to select a digital component for delivery to the client device, as described in more detail with reference to FIG. 2.

For example, if the secret message whose two secret shares are $[is\_candidate_{sv,1}]$ and $[is\_candidate_{sv,2}]$ has a value of 0, that selection value will be deemed ineligible, such that the selection value cannot be used to trigger delivery of the corresponding digital component to the client device 106.

In some implementations, the source of the digital components can provide selection criteria, including selection values, for digital components to the MPC system. The selection value can indicate an amount that the digital component server 108 (or the content source) is willing to provide for presentation or user interaction with the digital component. The MPC system can store the selection criteria for future digital component requests received from client devices 106. For each digital component, a content source can also upload additional data, e.g., metadata, for the digital component. The additional data for a digital component can include a user group identifier (e.g., interest group identifier) for a user group corresponding to the digital component. For example, the content source can manage a campaign, which includes a set of digital components) in which the digital component is distributed to client devices 106 of users that are members of the user group.

The additional data for a digital component can include contextual selection signals that indicate the context for which the digital component is eligible, e.g., location of client device 106, spoken language selected for the application 107, Universal Resource Locators (URL) for resources with which the digital component can be presented and/or excluded URLs for resources with which the digital component cannot be presented. This data for a digital component can also identify the digital component, e.g., using a unique identifier, a domain from which the digital component can be obtained, and/or other appropriate data for the digital component.

In some implementations, the MPC system caches, or otherwise stores, selection values for digital components provided to the MPC system for digital component requests. In this example, the contextual signals for the digital component and the selection value can include the contextual signals included in that digital component request.

In some implementations, each computation server of the MPC system stores the selection values for digital components using a two stage lookup table (LUT). The first stage can be keyed by a user group request key (UG_Request_Key). The UG_Request_Key can be a composite message that is based on a set of contextual signals, e.g., a set of contextual signals of a digital component request (e.g., URL, location, language, etc.) or a set of contextual signals for which a digital component is eligible for distribution. That is, the first stage LUT can be keyed based on a set of contextual signals. The key for the first stage can be a hash of the UG_Request_Key, e.g., using a hash function such as SHA256. This key can be truncated to a specified number of bits, e.g., to 16 bits, 32 bits, or another appropriate number of bits. The value for each key UG_Request_Key in the first stage LUT can indicate the rows of the second stage LUT that includes data for digital components that are eligible for digital component requests that include the contextual signals of the UG_Request_Key. An example first stage LUT is shown below as Table 1.

TABLE 1

| Key | Value |
|---|---|
| SHA256(UG_Request_Key) | Rows . . . |
| . . . | Rows . . . |

The second stage LUT can be keyed based on a combination of the user group request key UG_Request_Key in the first stage LUT and a user group identifier. Each row in the second stage LUT can be for a particular selection value for a particular digital component. For example, a content source can submit different selection values for the same digital component, which each selection value being for a different set of contextual signals and/or different user group identifiers. Thus, the selection values for a digital component can vary based on context.

A content source (e.g., a digital component server 108) can associate, e.g., link or map, a digital component to a user group to which the content source wants the digital component to be presented. For example, a digital component server 108 may specify that a digital component related to men's basketball shoes is to be presented to men that have shown an interest in basketball and/or shoes. In this example, the digital component server 108 can provide, to the MPC system, data indicating that the digital component corresponds to the user group identifier for a user group that includes men that have shown an interest in basketball and/or shoes.

In some implementations, the key for a row in the second stage LUT can be a hash or code generated based on the combination of the user group request key UG_Request_Key and the user group identifier for the digital component of the row. For example, the key can be a hash-based message authentication code (HMAC) of the combination, which can be represented as $HMAC_{SHA256}$ (UG_Request_Key, ug_id).

Continuing the previous men's basketball shoes example, the second stage lookup key for the row that includes information for the digital component that is to be presented to users in the men's basketball shoes group can be a combination of the user group request key UG_Request_Key and the user group identifier ug_id for the men's basketball shoes group. As the digital component can be presented in different contexts, the second stage lookup table can include multiple rows for the digital component, the user group identifier ug_id for the men's basketball shoes group, each with different user group request key UG_Request_Key and different values.

The value for each row of the second stage LUT can be the selection value for the digital component and other data for the digital component, e.g., metadata that identifies the digital component or the network location from which the digital component can be downloaded, etc. The value can be a digital component information element dc_i nformation_element, which can be a byte array having the selection value and the metadata. The byte array can have a particular format that applications 107 or trusted programs of client devices 106, and the computing systems MPC1 and MPC2 can parse to obtain the selection value and metadata. An example second stage LUT is shown below as Table 2.

TABLE 2

| Key | Value |
|---|---|
| HMAC(UG_Request_Key, UG_ID) | {selection value (sv), metadata} |
| ... | ... |

The second stage LUT maps a selection value to a particular digital component, a particular user group identifier ug_id and to a particular set of contextual signals defined by the first stage lookup key UG_Request_Key. By doing so, the second stage LUT indicates the particular context of a digital component slot for which the selection value for the digital component is intended. This allows the digital component server 108 to specify different selection values for the same digital component for different contexts defined by the contextual signals and a user's group membership. When a digital component request is received that indicates that the user to which the digital component will be presented is a member of a particular user group identified by a particular user group identifier ug_id and the digital component will be presented in a particular context defined by the contextual signals of the first stage lookup key, any selection values in the second stage LUT that has a matching user group identifier and a matching first stage lookup key is a candidate for being selected for distribution in response to the request.

Figure 2:
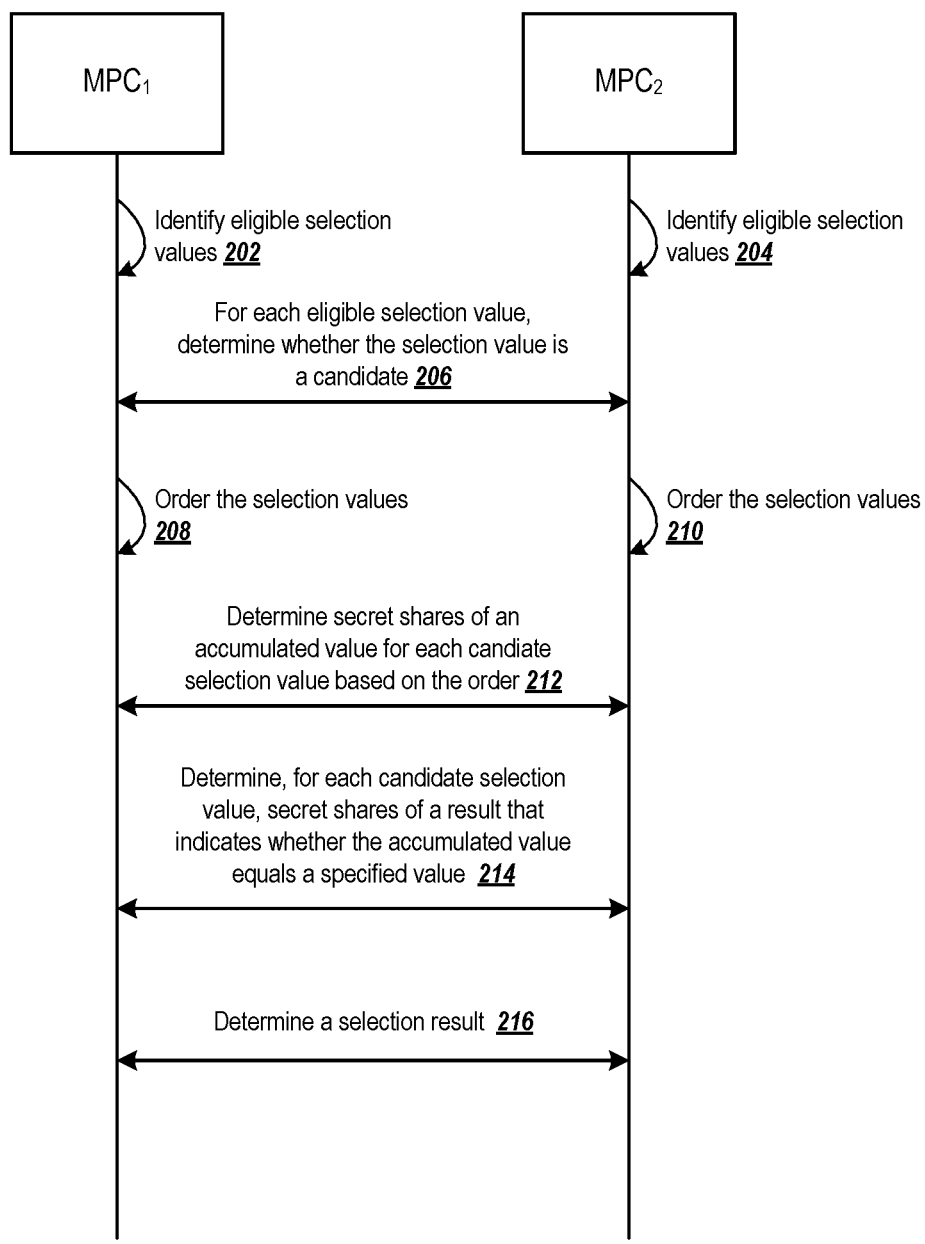
FIG. 2 is a swim lane diagram of an example process for selecting a digital component for distribution to a client device.

FIG. 2 is a swim lane diagram of an example process 200 for selecting a digital component for distribution to a client device. Operations of the process 200 can be implemented, for example, by the computing systems MPC1 and MPC2 of the MPC system. Operations of the process 200 can also be implemented as instructions stored on one or more computer readable media which may be non-transitory, and execution of the instructions by one or more data processing apparatus can cause the one or more data processing apparatus to perform the operations of the process 200.

The computing system MPC1 identifies eligible selection values (202). The computing system MPC1 can identify eligible selection values for a digital component request received from an application 107, as described in detail above with reference to FIG. 1. For example, when the application 107 initiates a request for a digital component for a slot, the application can transmit rand_var1a, rand_var1b and rand_var2 as parameters in digital component request to MPC1. The digital component request can also include the first stage lookup key, e.g., SHA256 (UG_Request_Key), generated based on the contextual signals for the digital component request.

The computing system MPC1 can identify the eligible selection values using the first stage lookup key of the digital component request. The computing system MPC1 can access the first stage LUT and use the first stage lookup key to identify the rows of the second stage LUT that include information for a selection value for a digital component that is eligible to presented, e.g., for which a selection value has been received, for the set of contextual signals represented by the first stage lookup key. For example, as described above, each row of the second stage LUT includes information for a digital component and a second stage lookup key that is based on a set of contextual signals. Thus, the computing system MPC1 can use the first stage lookup key to identify rows of the second stage LUT that have a set of contextual signals that match the set of contextual signals defined by the first stage lookup key received in the digital component request. These rows include information for digital components that are eligible to be presented or have eligible selection values for the context defined by the first stage lookup key received in the digital component request.

The computing system MPC2 identifies eligible selection values (204). The computing system MPC2 can identify eligible selection values for a digital component request received from a client device 106. For example, when the application 107 initiates a request for digital component for a slot, the application transmits the vector B, rand_var1a and rand_var1b to MPC1. The digital component request can also include the first stage lookup key, e.g., SHA256 (UG_Request_Key), generated based on the contextual signals for the digital component request. The first stage lookup key of the digital component requests received by computing system MPC2 can be the same as the first stage lookup key received by computing system MPC$_1$.

For brevity, the remaining steps of the process 200 are described in terms of selecting a digital component for distribution to the application 107 on the client device 106 in response to a digital component request in terms of the probabilistic data structure. The MPC system can select a digital component for the presentation on the application 107. For example, both MPC1 and MPC2 execute the secure MPC process to select a digital component, as described below.

The computing system MPC2 can identify the eligible selection values using the first stage lookup key of the digital component request. The computing system MPC2 can access the first stage LUT and use the first stage lookup key to identify the rows of the second stage LUT that include information for a digital component that is eligible to presented, e.g., for which a selection value has been received, for the set of contextual signals represented by the first stage lookup key. As described above, each computing system MPC1 and MPC2 can maintain a respective two stage LUT that includes the same information. Similar to MPC2, the MPC1 can also identify the eligible selection values using the first stage lookup key of the digital component request.

For each eligible selection value, the computing systems MPC1 and MPC2 determine whether the selection value and its digital component is a candidate for being selected for distribution to the application 107 in response to the digital component requests (206). The candidate selection values are the eligible selection values for digital components that have a user group identifier that matches a user group identifier for the user, e.g., a user group identifier for a user group that includes the user as a member and have universal identifiers that are not included in the set of blocked universal identifiers. As described above, each digital component can be mapped to one or more user groups that includes members to which the digital component server 108 indicated that the digital component should be presented. This information is part of the second stage lookup key for the second stage LUT, as described above.

A digital component of a row in the second stage LUT is a candidate for selection if its user group identifier ug_id that is part of the second stage lookup key for the row corresponding to each selection value (for each digital component) is included in the probabilistic data structure provided by the client device 106 by inspecting two locations within the probabilistic data structure received by that computation server of the MPC system. However, if the digital component is blocked (e.g., by inclusion of its universal identifier in the set of blocked universal identifiers), then the digital component still won't be eligible for delivery, even if the MPC system identifies a match between the user group identifier of the selection value for the digital component and the user group identifiers of the user.

The computing systems MPC1 and MPC2 can identify the candidate selection values using secure MPC techniques using secret shares such that neither MPC$_1$ nor MPC$_2$ knows which digital components are candidates or the user groups that include the user as a member. To do this, computing system MPC1 calculates a first share of a candidate parameter [is_candidate$_{sv,\ 1}$] for each selection value associated with user group identifier ug_id and associated with a digital component that is a candidate for selection. Similarly, computing system MPC2 calculates a second share of the candidate parameter [is_candidate$_{sv,\ 2}$] for each selection value associated with user group identifier ug_id associated with the same digital component. The candidate parameter [is_candidate$_{sv,\ 1}$] is the first secret share and [is_candidate$_{sv,\ 2}$] is the second secret share.

The computing systems MPC$_1$ and MPC$_2$ can use secret sharing techniques or secret sharing libraries that support the operations shown in Table 3 below. One example secret sharing technique that supports these operation is Security through Private Information Aggregation (SEPIA).

TABLE 3

| Syntax of Operation | Output | Remark |
|---|---|---|
| [a] + [b] | [a + b] | Add two shares for two secrets, respectively. |
| Reconstruct([a$_1$], [a$_2$]) | a | Reconstruct a secret a from its shares a$_1$ and a$_2$. The result is a in plaintext. |
| c × [a] | [c × a] | Multiply a share with a known constant in plaintext. |
| [a] × [b] | [a × b] | Multiply two shares of two secrets, respectively. |
| [a] == b | [1] if a == b,, [0] otherwise | Test the equality between a secret a represented as a secret share and a constant plaintext value b. This can require multiple roundtrips between MPC servers. |

The computation server MPC1 determines an order of the selection values (208). Similarly, the computation server MPC2 determines an order of the selection values (210). These two orders should be exactly the same because the input to the ordering process is the same on the two computing systems MPC1 and MPC2. Each computation servers MPC1 and MPC2 can determine an order of the selection values in its second stage LUT. This order can include all of the selection values in the second stage LUT associated with UG_Request_key, including the candidate selection values and the selection values that are not candidates. The order can be from the highest selection value to the lowest selection value. In some implementations, the selection values used for the order can be the value that would be provided to the publisher of the website with which a selected digital component would be presented. As the selection values are in cleartext, the computation servers MPC1 and MPC2 do not have to perform any roundtrip computations to order the selection values. Instead, each computing system MPC1 and MPC2 can order the selection values of its second stage LUT associated with UG_Request_key independently. If the selection values were stored as secret shares at each computation servers MPC1 and MPC2, with each computation servers MPC1 and MPC2 having a respective secret share of each selection value, the computation servers MPC1 and MPC2 can perform a secure MPC process using roundtrip computations to order the selection values. If there is a tie between two or more selection values, the computing systems MPC1 and MPC2 can break the tie deterministically using other metadata for the digital components corresponding to these selection values.

The computation servers MPC$_1$ and MPC$_2$ determine secret shares of an accumulated value for each candidate selection value (212). Conceptually, the accumulated value for a given selection value for a digital component represents a total number of candidate selection values from the top of the order to the given selection value, including the given selection value if the given selection value is a candidate. This concept is shown in Table 4 below.

TABLE 4

| Ordered Selection Values | is_candidate | Accumulated Value (acc) | Is Accumulated Value Equal to 1? |
|---|---|---|---|
| Highest | 0 | 0 | 0 |
| 2nd Highest | 1 | 1 | 1 |
| 3rd Highest | 0 | 1 | 1 |
| 4th Highest | 1 | 2 | 0 |
| ... | ... | ... | ... |

In this table, the accumulated value (acc) is incremented for each selection value that has a candidate parameter is_candidate equal to one as it progresses from the top of the order to the bottom of the order. For example, the accumulated value acc for the highest selection value is zero as the candidate parameter is_candidate for the highest selection value is equal to zero. The accumulated value acc for the second selection value is one as the candidate parameter is_candidate for the second selection value is equal to one and none of the selection values above the second highest selection value has a candidate parameter is_candidate equal to one. Moving down the order, the candidate parameter is_candidate for the third highest selection value is zero, so the accumulated value acc for the third selection value is not incremented from the accumulated value acc for the second selection value. As the candidate parameter is_candidate for the fourth highest selection value is one, the accumulated value acc for the fourth highest selection value is incremented by one from the accumulated value acc for the third highest selection value. Thus, the accumulated value acc for the fourth highest selection value is equal to two as there are two selection values that have a candidate parameter is_candidate from the highest selection value to the fourth highest selection value, inclusive.

Using this table, the computing systems $MPC_1$ and $MPC_2$ would select, for distribution to the application 107, the digital component corresponding to the selection parameter for which the candidate parameter is_candidate has a value of one and the accumulated value acc has a value of one, as indicated in the fourth column of Table 4. This represents the highest ordered selection value for which the candidate parameter is_candidate has a value of one. As the candidate parameter is_candidate is in secret shares for the computing systems MPC1 and MPC2 to maintain user privacy and ensure that user data is not leaked, the computing systems MPC1 and MPC2 determine secret shares of the accumulated value acc for each selection value and use roundtrip computations to determine which selection value has an accumulated value acc that is equal to one and a candidate parameter is_candidate that is equal to one.

The computation servers MPC1 and MPC2 can determine their secret shares of the accumulated value acc for each selection value independently without any roundtrip computations. For example, computation server MPC1 can determine, for each selection value, a first share $[acc_{sv, 1}]$ of the accumulated value acc for a selection value sv by traversing all of the selection values in order from highest to lowest and summing the candidate parameters is_candidate for the selection values along the way, as described above with reference to Table 4. Similarly, computation server $MPC_2$ can determine, for each selection value, a second share $[acc_{sv, 2}]$ of the accumulated value acc by traversing all of the selection values in order from highest to lowest and summing the candidate parameters is_candidate for the selection values along the way.

The computation servers MPC1 and MPC2 determine, for each selection value, secret shares of a result that indicates whether the accumulated value has a specified value (214). The specified value can be a value of one, as shown in columns 3 and 4 of Table 4. As described above, the selection value for which the accumulated value is one and the candidate parameter is_candidate is one is the highest selection value among the candidate selection values.

The computation servers MPC1 and MPC2 can engage in multiple rounds of computations, e.g., multiple remote procedure calls (RPCs), as part of a secure MPC process to calculate the equality operation $acc_{sv}=1$ in terms of secret shares for each selection value. At the end of this process, computation server MPC1 has, for each selection value, one secret share of the result $acc_{sv, 1}=1$, and computation server MPC2 has, for each selection value, the other secret share of the result $acc_{sv, 2}=1$.

The computation servers MPC1 and MPC2 determine a selection result (216). The computation servers MPC1 and MPC2 can determine the selection result based on, for each selection value, the secret shares of the $acc_{sv}=1$ and the secret shares of the candidate parameter is_candidate$_{sv}$. To do so, the computation servers MPC1 and MPC2 can calculate a winner parameter [is_winner$_{sv, 1}$] and [is_winner$_{sv, 2}$] in terms of secret shares. The winner parameter can be a Boolean value that indicates whether the selection value is the winner of the selection process, e.g., whether the digital component corresponding to the selection value is selected for distribution to the application 107 in response to the digital component request.

Each computation server MPC1 and MPC2 can collaboratively execute the crypto protocol calculate, for each selection value, the winner parameter in terms of secret shares. This requires one RPC between the computation servers MPC1 and MPC2 to multiple two secret shares. At the end of this MPC process, computation server MPC1 has one secret share of the result is_winner$_{sv}$ represented as [is_winner$_{sv, 1}$]=[is_candidate$_{sv, 1}$]×([acc$_{sv, 1}$]==1). Similarly, computation server MPC2 has the other secret share of the result is_winner$_{sv}$ represented as [is_winner$_{sv, 2}$]= [is_candidate$_{sv, 2}$]×([acc$_{sv, 2}$]==1). Note that for all selection values, at most one selection value has a winner parameter is_winner$_{sv}$ that is equal to one, which corresponds to the digital component that is selected for distribution to the application 107. All others would equal zero.

The computation servers MPC1 and MPC2 can calculate the selection result based on the winner parameters for the selection values and the digital component information element information_element for the selection values or the selection values themselves. As described above, the digital component information element information_element for a digital component can include the selection value for the digital component and other data for the digital component.

The computation servers MPC1 and MPC2 can calculate the selection result result$_{F1}$ using relationship 1 below.

$$result_{F_1} = \Sigma_{sv} is\_winner_{sv} \times information\_element_{sv} \quad (1)$$

In this example, the selection result result$_{F1}$ will either have a value zero if there are no cached selection values that have a user group identifier that matches a user group identifier of the user or will have a value equal to the digital component information element information_element of the selected digital component that has a is_winner$_{sv}$ that is equal to one. In another example, the digital component information element information_element can be replaced in relationship 1 with the selection values for the digital components. In this example, the selection result $result_{F1}$ will either have a value zero if there are no cached selection values that have a user group identifier that matches a user group identifier of the user or will have a value equal to the selection value of the selected digital component that has a is_winner$_{sv}$ that is equal to one.

To perform the calculation in secret shares, computing system MPC1 takes all of the selection values and multiplies the digital component information element information_element$_{sv}$ for the selection value, which can be in cleartext, by the first secret share of the winner parameter [is_winner$_{sv, 1}$]. The computing system MPC1 can then determine the sum of these products and return the sum to the client device 106 that submitted the digital component request. That is, MPC1 can determine, as a first share of the result, the sum using relationship 2 below.

$$[result_{F_1,1}] = \Sigma_{sv}([is\_winner_{sv,1}] \times information\_element_{sv}) \quad (2)$$

The computing system MPC2 can perform a similar calculation to determine the second share of the result using relationship 3 below.

$$[result_{F_1,2}] = \Sigma_{sv}([is\_winner_{sv,2}] \times information\_element_{sv}) \quad (3)$$

The computing system MPC1 can return the first share of the selection result to the application 107. Similarly, the computing system MPC2 can return the second share of the selection result to the application 107. The application 107 can then reconstruct the selection result $result_{F1}$ in cleartext using the two secret shares $[result_{F_1,1}]$ and $[result_{F_1,2}]$, e.g., by determining a sum of the secret shares, assuming additive secret share algorithms are adopted. If the selection result $result_{F1}$ has a value of zero, then the MPC cluster 130 did not identify a digital component for a user group that includes the user as a member. Otherwise, the selection result $result_{F1}$ has a value equal to a digital component information_element information_element, the application 107 can parse the digital component information element information_element to obtain the selection value and the metadata for the digital component. The application 107 can then either display the digital component or perform a selection process using the digital component and other digital components received from a digital component server 108 as described above.

In some implementations, the application 107 can perform a final verification that the user group for the digital component(s) selected by the MPC system matches a user group that includes the user as a member. For example, the digital component information element information_element for each digital component can include the user group identifier(s) for the digital component. The application 107 can compare the user group identifier(s) of the digital component information element information_element to the user group list for the user. If there is no match, the application 107 can exclude the digital component from the selection process. If there is a match, the application 107 can include the digital component in the selection process.

Figure 3:
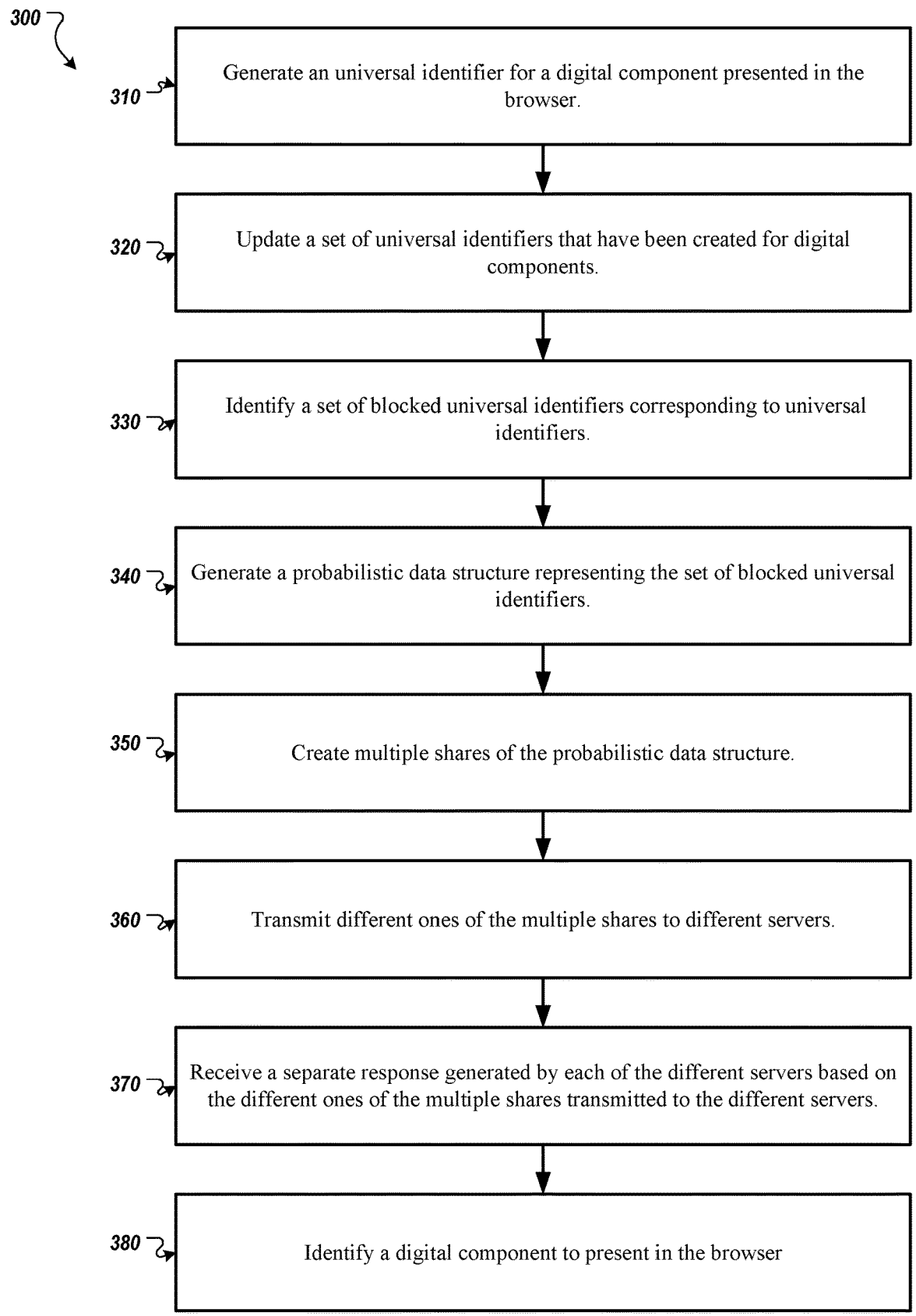
FIG. 3 is a flow diagram of an example process of distributing digital components to a client device.

FIG. 3 is a flow diagram of an example process of distributing digital components to a client device. Operations of process 300 are described below as being performed by the components of the system described and depicted in FIG. 1. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions causes one or more data processing apparatus to perform operations of the process 300.

Generate a universal identifier for a digital component that is presented on the browser (310). After retrieving the campaign identifier and the eTLD+1 of the domain of the digital content provider, also referred to as a content source, for a particular digital component, the application 107 can generate a universal identifier for the particular digital component. In some implementations, the content source may calculate the universal identifier. The universal identifier for a digital component can be calculated using hash-based message authentication code (HMAC) parameterized by the campaign identifier and domain of the digital component server 108 represented as HMAC (campaign_identifier, eTLD+1). In some implementations, the HMAC can be implemented using secure hash algorithm (SHA-256) which is a cryptographic hash function with a digest length of 256 bits to generate a hashed 256 bit (32 byte) output. In such an example, HMAC (campaign_identifier, eTLD+1) generates, as the universal identifier, a 256 bit unique identifier for the digital component.

Update a set of universal identifiers that have been created for digital components (320). The application 107 maintains a set of universal identifiers that uniquely identifies digital components across the entire space of campaigns across all digital component servers 108. After computing/generating a universal identifier for a particular digital component that was delivered to and presented on the client device 106, the application 107 updates the set of universal identifiers with the universal identifier of the particular digital component. For example, when the universal identifier for the particular digital component does not already exist in the set, the application 107 adds the universal identifier of the particular digital component to the set and increments the corresponding presentation counter by one. In a situation when the universal identifier for the particular digital component already exists in the set, the application 107 updates the corresponding presentation counter of the universal identifier, for example, by incrementing the counter by one.

Identify a set of blocked universal identifiers corresponding to universal identifiers (330). The application 107 executing at the client device 106 can maintain a set of blocked universal identifiers that includes universal identifiers of digital components that have been explicitly blocked by the user recently. For example, assume that a user interacts with a mute element corresponding to a given digital component (or a portion of data that was delivered to the client device 106). In this example, the user's interaction with the mute element is an indication that the user does not want to see that digital component, or potentially similar digital components (e.g., from a same content source or campaign, or visually similar), in the future (e.g., for at least a certain amount of time). In response to the interaction the application 107 can add the universal identifier for the given digital component to the set of blocked universal identifiers, which can then be used to prevent delivery (or presentation) of other digital components having the same universal identifier as the given digital component.

The application 107 can add to the set of blocked universal identifiers, those universal identifiers of digital components that have been delivered/presented at least a predetermined number of times (e.g., presented more than X times over a specified time period, such as a day, a week, a month, etc.). For example, when digital components having the universal identifier 1A2B3C have been delivered to/presented to a particular user more than X times over the last Y days, the application 107 can add the universal identifier 1A2B3C to the set of blocked universal identifiers, which is stored at the client device 106.

Generate a probabilistic data structure representing the set of blocked universal identifiers and user group identifiers (240). The application 107 can generate a probabilistic data structure representing the set of blocked universal identifiers and the user groups to which the client device 106 (or user) belongs. In some implementations, the probabilistic data structure is a cuckoo filter. To generate the cuckoo filter, the application 107 uses a pseudo random function (PRF) parameterized by either the user group identifier or the universal identifier from the set of blocked universal identifiers and either one of two random variables generated by the application 107. For example, assume that the three random variables generated by the application 107 are rand_var1a, rand_var1b and rand_var2. Also assume that each item in a bucket is a k-bit integer. The application can generate a cuckoo filter table containing PRF(ug_id, rand_var1a) and PRF(blocked_uid, rand_var1b) where ug_id is the identifier of the user group generated by applying HMAC on the label of the user group based on the domain of the content provider and blocked_uid is an identifier from the set of blocked universal identifier.

Create multiple shares of the probabilistic data structure (250). The application 107 can generate a vector $B_i$ based on the cuckoo filter table generated for the user group identifiers and the universal identifiers in the set of blocked universal identifiers. The vector B can be represented as $B_i = PRF(rand\_var2, i) - A_i$ where $A_i$ is the content of the $i^{th}$ entry in the cuckoo filter table and i is the index of the vector $B_i$ and cuckoo filter table $A_i$. The application 107 generates rand_var1a, rand_var1b and rand_var2 as parameters in the digital component request sent to MPC1. The application 107 also generates vector B, rand_var1a and rand_var1b as parameters in the digital component request sent to MPC2.

Transmit different ones of the multiple shares to different servers (260). For example, when the application 107 initiates a request for digital component for a slot, the application transmits rand_var1a, rand_var1b and rand_var2 as request parameters to MPC1. The application 107 also transmits the vector B, rand_var1a and rand_var1b as request parameters to MPC2.

Receive a separate response generated by each of the different servers based on the different ones of the multiple shares transmitted to the different servers (270). After receiving the secret shares, each of the respective computation servers within the MPC system performs a secure MPC process using the secret shares of the probabilistic data structure to select a digital component. For example, MPC1 can calculate an array T where the $i^{th}$ element of the array $T_i = PRF(rand\_var2, i)$. When determining the eligibility of each digital component for selection, a determination can be made whether each of the digital components is blocked by the set of blocked universal identifiers, and whether the user group identifier (e.g., interest group identifier) for the user matches the user group identifier corresponding to a selection value for each digital component).

Each computation server of the MPC system can use the values determined to determine the eligibility of different digital components based on the secret share information. Each computation server of the MPC system is also determining whether the universal identifier corresponding to each selection value is contained in the set of blocked universal identifiers that were included in the probabilistic data structure provided by the client device in the secret share of the probabilistic data structure received by that MPC. In order for a digital component to be eligible for distribution, the user group identifier associated with the selection value for that digital component must be found in the probabilistic data structure, and the universal identifier for the digital component cannot be found in the probabilistic data structure.

Details of the selection process is explained with reference to FIG. 2. The computation servers of the MPC system thereafter compute the selection result $result_{F1}$, generates secret shares of the $result_{F1}$ and transmits the respective secret shares to the application 107. For example, MPC1 can return the first share of the selection result to the application 107. Similarly, the computing system MPC2 can return the second share of the selection result to the application 107.

Identify a digital component to present in the browser (280). The application 107 can reconstruct the selection result $result_{F1}$ in cleartext using the secret shares received from the computation servers of the MPC system. For example, the application 107 can then reconstruct the selection result $result_{F1}$ in cleartext using the two secret shares and, e.g., by determining a sum of the secret shares.

Figure 4:
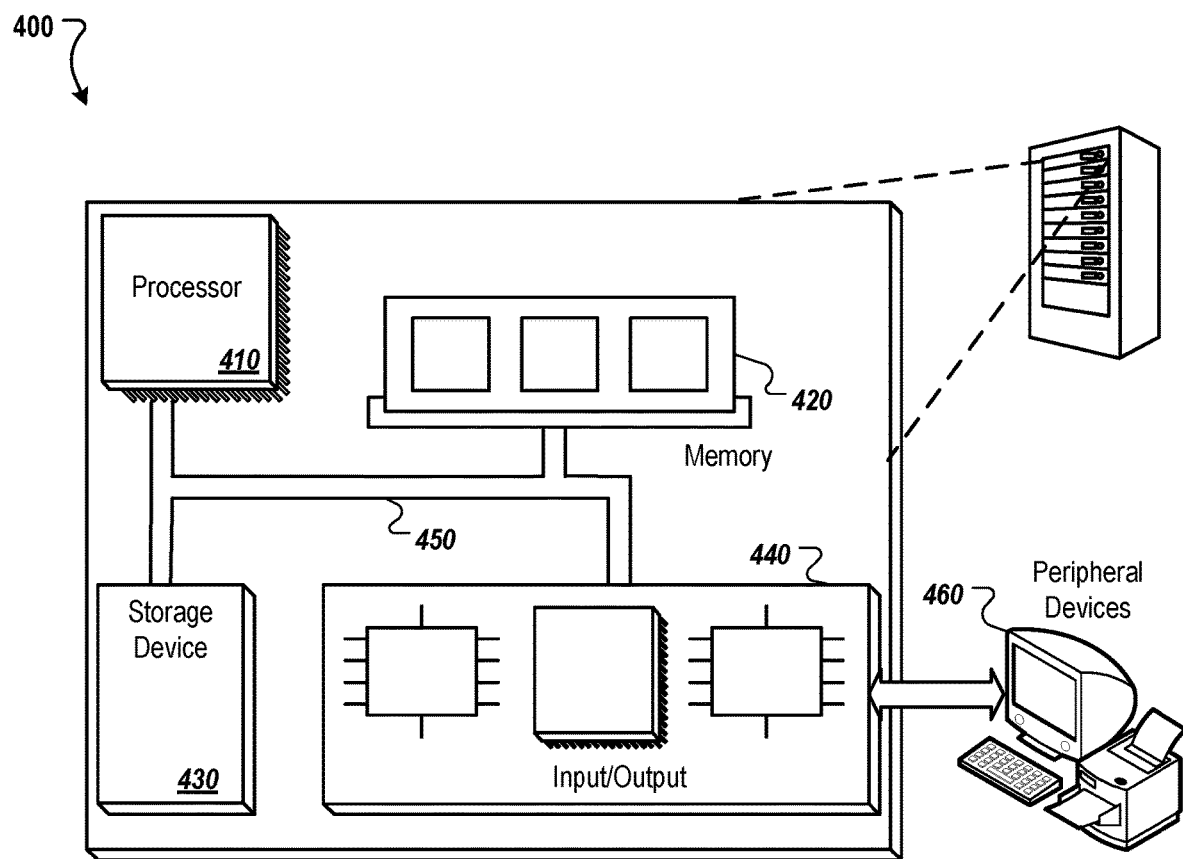
FIG. 4 is a block diagram of an example computer system that can be used to perform operations described.

FIG. 4 is block diagram of an example computer system 400 that can be used to perform operations described above. The system 300 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 370. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
generating, by an application and for a digital component presented in the application, a universal identifier that is an encrypted version of a combination of (i) a campaign identifier for a content source that provides the digital component and (ii) a domain of the content source;
updating, by the application, a set of universal identifiers that have been created for digital components presented by the application over a specified time period based on the generated universal identifier;
identifying, by the application, a set of blocked universal identifiers corresponding to universal identifiers that have been (i) generated by the application, and (ii) blocked from being used to present future digital components in the application;
generating, by the application, a probabilistic data structure representing the set of blocked universal identifiers;
creating, by the application, multiple shares of the probabilistic data structure;
transmitting, by the application, different ones of the multiple shares to different servers;
receiving, by the application, a separate response generated by each of the different servers based on the different ones of the multiple shares transmitted to the different servers; and
identifying, by the application and based on a combination of the separate responses, a digital component to present in the application.

2. The method of claim 1, further comprising:
detecting, by the application, interaction with a mute element corresponding to a given digital component presented in the application; and
updating the set of blocked universal identifiers to include the universal identifier of the given digital component in response to detecting the interaction with the mute element in a most recent timeframe.

3. The method of claim 1, wherein updating the set of universal identifiers comprises incrementing a presentation counter indicative of a frequency of presentation of digital components having a particular universal identifier in response to presentation of a digital component associated with the particular universal identifier by the application.

4. The method of claim 3, further comprising adding the particular universal identifier to the set of blocked universal identifiers when the presentation counter exceeds a specified value.

5. The method of claim 1, wherein generating the probabilistic data structure comprises generating the probabilistic data structure representing (i) the set of blocked universal identifiers and (ii) a set of user group identifiers corresponding to user groups assigned to a user of the application.

6. The method of claim 5, wherein generating the probabilistic data structure further comprises using a pseudo random function that is parameterized by two or more random variables.

7. The method of claim 1, wherein an entity providing the digital component can generate the universal identifier for the digital component.

8. The method of claim 1, wherein the probabilistic data structure is a cuckoo filter.

9. A system, comprising:
a memory device; and
one or more processors configured to access the memory device and execute instructions that, upon execution, cause the one or more processors to perform operations comprising:
generating, by an application and for a digital component presented in the application, a universal identifier that is an encrypted version of a combination of (i) a campaign identifier for a content source that provides the digital component and (ii) a domain of the content source;
updating, by the application, a set of universal identifiers that have been created for digital components presented by the application over a specified time period based on the generated universal identifier;

identifying, by the application, a set of blocked universal identifiers corresponding to universal identifiers that have been (i) generated by the application, and (ii) blocked from being used to present future digital components in the application;

generating, by the application, a probabilistic data structure representing the set of blocked universal identifiers;

creating, by the application, multiple shares of the probabilistic data structure;

transmitting, by the application, different ones of the multiple shares to different servers;

receiving, by the application, a separate response generated by each of the different servers based on the different ones of the multiple shares transmitted to the different servers; and identifying, by the application and based on a combination of the separate responses, a digital component to present in the application.

10. The system of claim 9, wherein the instructions cause the one or more processors to perform operations further comprising:

detecting, by the application, interaction with a mute element corresponding to a given digital component presented in the application; and updating the set of blocked universal identifiers to include the universal identifier of the given digital component in response to detecting the interaction with the mute element in a most recent timeframe.

11. The system of claim 9, wherein updating the set of universal identifiers comprises incrementing a presentation counter indicative of a frequency of presentation of digital components having a particular universal identifier in response to presentation of a digital component associated with the particular universal identifier by the application.

12. The system of claim 11, wherein the instructions cause the one or more processors to perform operations further comprising.

13. The system of claim 9, wherein generating the probabilistic data structure comprises generating the probabilistic data structure representing (i) the set of blocked universal identifiers and (ii) a set of user group identifiers corresponding to user groups assigned to a user of the application.

14. The system of claim 13, wherein generating the probabilistic data structure further comprises using a pseudo random function that is parameterized by two or more random variables.

15. The system of claim 9, wherein an entity providing the digital component can generate the universal identifier for the digital component.

16. The system of claim 9, wherein the probabilistic data structure is a cuckoo filter.

17. A non-transitory computer readable medium storing instructions that, when executed by one or more data processing apparatus, cause the one or more data processing apparatus to perform operations comprising:

generating, by an application and for a digital component presented in the application, a universal identifier that is an encrypted version of a combination of (i) a campaign identifier for a content source that provides the digital component and (ii) a domain of the content source;

updating, by the application, a set of universal identifiers that have been created for digital components presented by the application over a specified time period based on the generated universal identifier;

identifying, by the application, a set of blocked universal identifiers corresponding to universal identifiers that have been (i) generated by the application, and (ii) blocked from being used to present future digital components in the application;

generating, by the application, a probabilistic data structure representing the set of blocked universal identifiers;

creating, by the application, multiple shares of the probabilistic data structure;

transmitting, by the application, different ones of the multiple shares to different servers;

receiving, by the application, a separate response generated by each of the different servers based on the different ones of the multiple shares transmitted to the different servers; and identifying, by the application and based on a combination of the separate responses, a digital component to present in the application.

18. The non-transitory computer readable medium of claim 17, wherein the instructions cause the one or more data processing apparatus to perform operations further comprising:

detecting, by the application, interaction with a mute element corresponding to a given digital component presented in the application; and updating the set of blocked universal identifiers to include the universal identifier of the given digital component in response to detecting the interaction with the mute element in a most recent timeframe.

19. The non-transitory computer readable medium of claim 17, wherein generating the probabilistic data structure comprises generating the probabilistic data structure representing (i) the set of blocked universal identifiers and (ii) a set of user group identifiers corresponding to user groups assigned to a user of the application.

20. The non-transitory computer readable medium of claim 19, wherein generating the probabilistic data structure further comprises using a pseudo random function that is parameterized by two or more random variables.

* * * * *